United States Patent
Yano et al.

(10) Patent No.: US 10,144,984 B2
(45) Date of Patent: Dec. 4, 2018

(54) METHOD OF PRODUCING ROUGHLY SHAPED MATERIAL FOR ROLLING BEARING

(71) Applicant: NIPPON STEEL & SUMITOMO METAL CORPORATION, Tokyo (JP)

(72) Inventors: Takefumi Yano, Itano-gun (JP); Shinichirou Kashiwagi, Osaka (JP); Hiroki Uekita, Lexington, KY (US); Toshikazu Saitou, Osaka (JP); Tetsurou Hirano, Osaka (JP); Yutaka Neishi, Hokkaido (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 97 days.

(21) Appl. No.: 15/029,449

(22) PCT Filed: Oct. 27, 2014

(86) PCT No.: PCT/JP2014/078471
§ 371 (c)(1),
(2) Date: Apr. 14, 2016

(87) PCT Pub. No.: WO2015/068601
PCT Pub. Date: May 14, 2015

(65) Prior Publication Data
US 2016/0265077 A1 Sep. 15, 2016

(30) Foreign Application Priority Data
Nov. 7, 2013 (JP) .................................. 2013-231292

(51) Int. Cl.
*C21D 9/40* (2006.01)
*F16C 19/36* (2006.01)
(Continued)

(52) U.S. Cl.
CPC .................. *C21D 9/40* (2013.01); *B21K 1/04* (2013.01); *C21D 1/32* (2013.01); *C21D 7/13* (2013.01);
(Continued)

(58) Field of Classification Search
CPC ...... B21K 1/04; C21D 1/22; C21D 2211/003; C21D 7/13; C21D 8/00; C21D 9/40;
(Continued)

(56) References Cited

U.S. PATENT DOCUMENTS 6,620,262 B1 9/2003 Okita et al.
2007/0199632 A1 8/2007 Iwamoto et al.

FOREIGN PATENT DOCUMENTS

CN 103122433 A 5/2013
EP 1826286 A2 8/2007
(Continued)

OTHER PUBLICATIONS

Extended European Search Report, dated Jul. 10, 2017, for corresponding European Application No. 14860823.5.
(Continued)

*Primary Examiner* — Christopher S Kessler
*Assistant Examiner* — Anthony M Liang
(74) *Attorney, Agent, or Firm* — Birch, Stewart, Kolasch & Birch, LLP

(57) ABSTRACT

A roughly shaped material for a rolling bearing of the present invention is produced by forging a steel composed of a high-carbon chrome bearing steel containing 0.7 mass % to 1.2 mass % of a carbon, and 0.8 mass % to 1.8 mass % of a chromium to a predetermined shape while heating the steel to a forging temperature in a range of ($Ae_1$ point+25° C.) to ($Ae_1$ point+105° C.), cooling a forged article to a temperature of $Ae_1$ point or lower, and performing an annealing in which the forged article that is obtained is
(Continued)

heated to a soaking temperature in a range of ($Ae_1$ point+25° C.) to ($Ae_1$ point+85° C.), the forged article is retained for 0.5 hours or longer, and the forged article is cooled down to 700° C. or lower at a cooling rate of 0.30° C./s or slower.

4 Claims, 11 Drawing Sheets

(51) Int. Cl.

| | |
|---|---|
| *B21K 1/04* | (2006.01) |
| *C21D 8/00* | (2006.01) |
| *C22C 38/00* | (2006.01) |
| *C22C 38/18* | (2006.01) |
| *C22C 38/40* | (2006.01) |
| *F16C 33/62* | (2006.01) |
| *F16C 33/64* | (2006.01) |
| *C22C 38/02* | (2006.01) |
| *C22C 38/04* | (2006.01) |
| *C21D 7/13* | (2006.01) |
| *C21D 1/32* | (2006.01) |

(52) U.S. Cl.
CPC ............... *C21D 8/00* (2013.01); *C22C 38/00* (2013.01); *C22C 38/002* (2013.01); *C22C 38/02* (2013.01); *C22C 38/04* (2013.01); *C22C 38/18* (2013.01); *C22C 38/40* (2013.01); *F16C 19/36* (2013.01); *F16C 33/62* (2013.01); *F16C 33/64* (2013.01); *C21D 2211/003* (2013.01); *F16C 19/364* (2013.01); *F16C 2204/66* (2013.01); *F16C 2204/70* (2013.01)

(58) Field of Classification Search
CPC ....... C22C 38/00; C22C 38/002; C22C 38/02; C22C 38/04; C22C 38/18; C22C 38/40; F16C 19/36; F16C 19/364; F16C 2204/66; F16C 2204/70; F16C 33/62; F16C 33/64
See application file for complete search history.

(56) References Cited

FOREIGN PATENT DOCUMENTS

| | | |
|---|---|---|
| JP | 2001-123221 A | 5/2001 |
| JP | 2002-12919 A | 1/2002 |
| JP | 2007-113034 A | 5/2007 |
| JP | 2007-231332 A | 9/2007 |
| JP | 2008-194742 A | 8/2008 |
| JP | 2009-24218 A | 2/2009 |
| JP | 2009-108354 A | 5/2009 |
| WO | WO 99/34023 A1 | 7/1999 |

OTHER PUBLICATIONS

International Search Report for PCT/JP2014/078471 dated Jan. 27, 2015.
Written Opinion of the International Searching Authority for PCT/JP2014/078471 (PCT/ISA/237) dated Jan. 27, 2015.
Japanese Office Action, dated Oct. 3, 2017, for Japanese Application No. 2013-231292, with an English translation.

FIG. 4
(A)
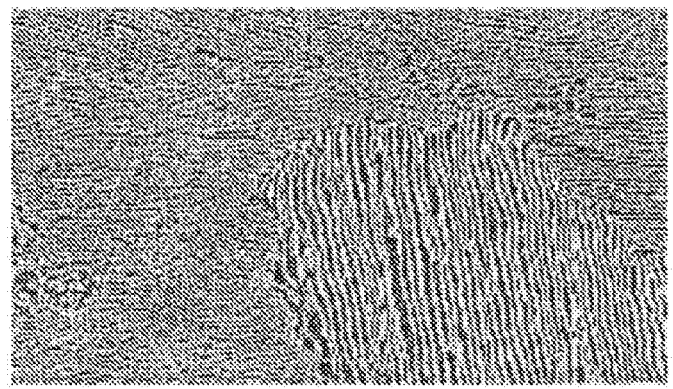
10 μm
(B)
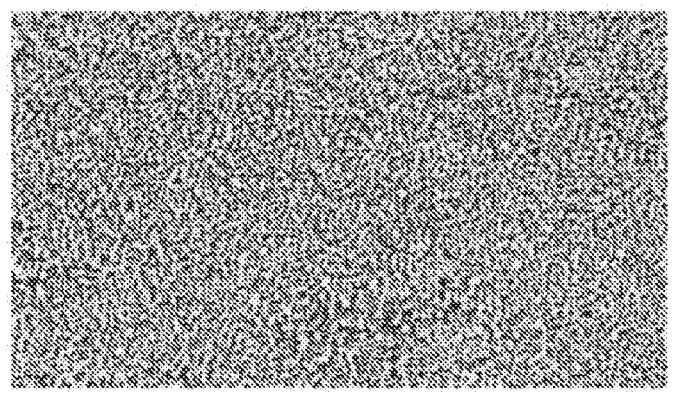
10 μm
(C)
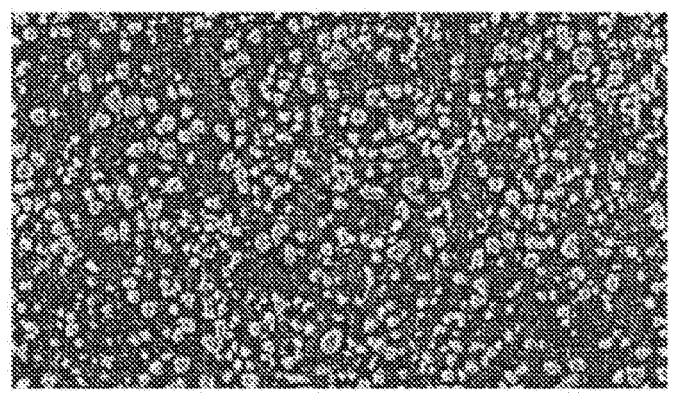
10 μm

METHOD OF PRODUCING ROUGHLY SHAPED MATERIAL FOR ROLLING BEARING

TECHNICAL FIELD OF THE INVENTION

The present invention relates to a method of producing a roughly shaped material for a rolling bearing.

Priority is claimed on Japanese Patent Application No. 2013-231292, filed on Nov. 7, 2013, the content of which is incorporated herein by reference.

RELATED ART

For example, as shown in FIG. 11(A), a roughly shaped material for formation of a bearing ring of a rolling bearing that is used in automobiles, industrial machinery, and the like is produced by a method including a process (hot forging) of heating steel composed of high-carbon chrome bearing steel to a forging temperature in a range of 1100° C. to 1200° C. and performing plastic working with respect to the steel, a process of cooling a forged article that is obtained, and a process of performing an annealing treatment in which the forged article after cooling is heated to a soaking temperature in a range of 780° C. to 810° C., and the forged article that is heated is slowly cooled down. In the method, after hot forging and cooling are performed to allow cementite to precipitate (refer to FIG. 11(B)), it is necessary to spheroidize cementite by performing an annealing treatment for 15 hours to 16 hours (refer to FIG. 11(B)). Accordingly, the method has a disadvantage in that a long period of time is taken for production of the roughly shaped material.

Accordingly, so as to shorten the time required for production of the roughly shaped material, some of the present inventors have suggested a method of shortening or omitting the spheroidizing annealing by heating steel composed of high-carbon chrome bearing steel to a temperature T in a range of $Ae_1$ point to ($Aem$ point+50° C.) while controlling a heating rate so that the heating rate in a temperature range of 600° C. or higher is set to 10° C./s or greater, and forging the steel at a temperature in a range of ($Ar_1$ point+150° C.) to $Ar_1$ point in 10 minutes after reaching the temperature T (for example refer to Patent Document 1).

PRIOR ART DOCUMENT

Patent Document

[Patent Document 1] Japanese Unexamined Patent Application, First Publication No. 2009-24218

DISCLOSURE OF THE INVENTION

Problems to be Solved by the Invention

According to the method described in Patent Document 1, a spheroidal cementite structure, which is formed through spheroidizing annealing in the related art, can be formed by performing only forging without performing spheroidizing annealing. Accordingly, it is possible to shorten or omit the annealing treatment for a long period of time (15 hours to 16 hours). However, in the method described in Patent Document 1, in a case where steel composed of high-carbon chrome bearing steel is forged at a temperature in a range of ($Ar_1$ point+150° C.) to $Ar_1$ point, a desired spheroidal cementite structure is obtained, but grains of ferrite, which is a matrix structure, are considerably refined depending on forging conditions or a portion of the roughly shaped material that is obtained through forging. Along with the refinement, hardness may rise to approximately Hv350 to Hv400. In this case, machinability may decrease in accordance with the rising of the hardness, or additional processing may be difficult.

The invention has been made in consideration of the above-described circumference, and an object thereof is to provide a method of producing a roughly shaped material for a rolling bearing, which is capable of producing the roughly shaped material capable of stably securing satisfactory machinability, in a short period of time.

Means for Solving the Problem

According to an aspect of the invention, there is provided a method of producing a roughly shaped material for a rolling bearing by forging a steel composed of a high-carbon chrome bearing steel containing 0.7 mass % to 1.2 mass % of a carbon, and 0.8 mass % to 1.8 mass % of a chromium. The method includes (A) forging the steel to a predetermined shape while heating the steel to a forging temperature in a range of ($Ae_1$ point+25° C.) to ($Ae_1$ point+105° C.), and cooling a forged article to a temperature of $Ae_1$ point or lower, and (B) performing an annealing in which the forged article obtained in (A) is heated to a soaking temperature in a range of ($Ae_1$ point+25° C.) to ($Ae_1$ point+85° C.), the forged article is retained for 0.5 hours or longer, and the forged article is cooled down to 700° C. or lower at a cooling rate of 0.30° C./s or slower.

According to the method of producing a roughly shaped material for a rolling bearing of the invention, in the process (A), the steel composed of high-carbon chrome bearing steel is forged (warm forged) at a forging temperature in a range of ($Ae_1$ point+25° C.) to ($Ae_1$ point+105° C.), and is cooled down to a temperature of $Ae_1$ point or lower to form fine spheroidal cementite in a state of being dispersed in a structure of steel. Then, in the process (B), the forged article that is obtained is retained at a soaking temperature in a range of ($Ae_1$ point+25° C.) to ($Ae_1$ point+85° C.) for 0.5 hours or longer and is cooled down to 700° C. or lower at a cooling rate of 0.30° C./s or slower so as to grow the fine spheroidal cementite to a relatively large size. Accordingly, it is possible to further shorten the production time in comparison to a production method in the related art in which steel is subjected to plastic working (hot forging) by heating the steel to a forging temperature of 1100° C. to 1200° C. Furthermore, it is possible to obtain a roughly shaped material capable of securing satisfactory machinability during production of bearing rings and the like.

In the method of the related art (method described in Patent Document 1), steel composed of high-carbon chrome bearing steel is forged at a temperature in a range of ($Ar_1$ point+150° C.) to $Ar_1$ point to form spheroidal cementite. However, in the method of the related art, even when the steel is forged under desired conditions, a locally fine ferrite structure is formed due to heat extraction through contact with a die or air, and the like. Therefore, a variation is likely to occur in a distribution of hardness due to a fine structure, in a state of a microstructure, and a distribution of the amount of residual austenite after a quenching and tempering treatment (hereinafter, also referred to as "QT" treatment) due to unevenness of the microstructure. However, according to the method of producing a roughly shaped material for a rolling bearing of the invention, after forging and cooling (the process A), the forged article that is obtained is annealed by retaining the forged article at a soaking temperature in a range of (Ae$_1$ point+25° C.) to (Ae$_1$ point+85° C.) for 0.5 hours or longer, and by cooling the forged article to 700° C. or lower at a cooling rate of 0.30° C./s or slower. Accordingly, it is possible to effectively suppress occurrence of a variation in the distribution of hardness, the state of the microstructure, and the distribution of the amount of residual austenite after the QT treatment.

In the method of producing a roughly shaped material for a rolling bearing of the invention, it is preferable that the soaking temperature in the process (B) is set to 760° C. to 820° C. In this case, it is possible to more efficiently grow the spheroidal cementite.

In addition, in the method of producing a roughly shaped material for a rolling bearing of the invention, it is preferable that the cooling rate in the process (B) is set to 0.30° C./s or slower. In this case, formation of sheet-shaped or layered cementite is suppressed. Accordingly, it is possible to more efficiently grow the spheroidal cementite.

Effects of the Invention

According to the method of producing a roughly shaped material for a rolling bearing of the invention, it is possible to produce a roughly shaped material capable of securing machinability in a short period of time.

BRIEF DESCRIPTION OF THE DRAWINGS

FIG. 4 is a drawing-substituting photograph showing results obtained by observing a structure state in each process of the production method according to the embodiment of the invention, (A) is a drawing-substituting photograph of a steel structure before the warm forging process, (B) is a drawing-substituting photograph of a structure of a forged article at the time of terminating the warm forging process, and (C) is a drawing-substituting photograph of a structure of a roughly shaped material for bearing rings which is obtained after an annealing process.

EMBODIMENTS OF THE INVENTION

Hereinafter, a method (hereinafter, also simply referred to as "production method") of producing a roughly shaped material for a rolling bearing of the invention will be described in detail with reference to the accompanying drawings.

Figure 1:
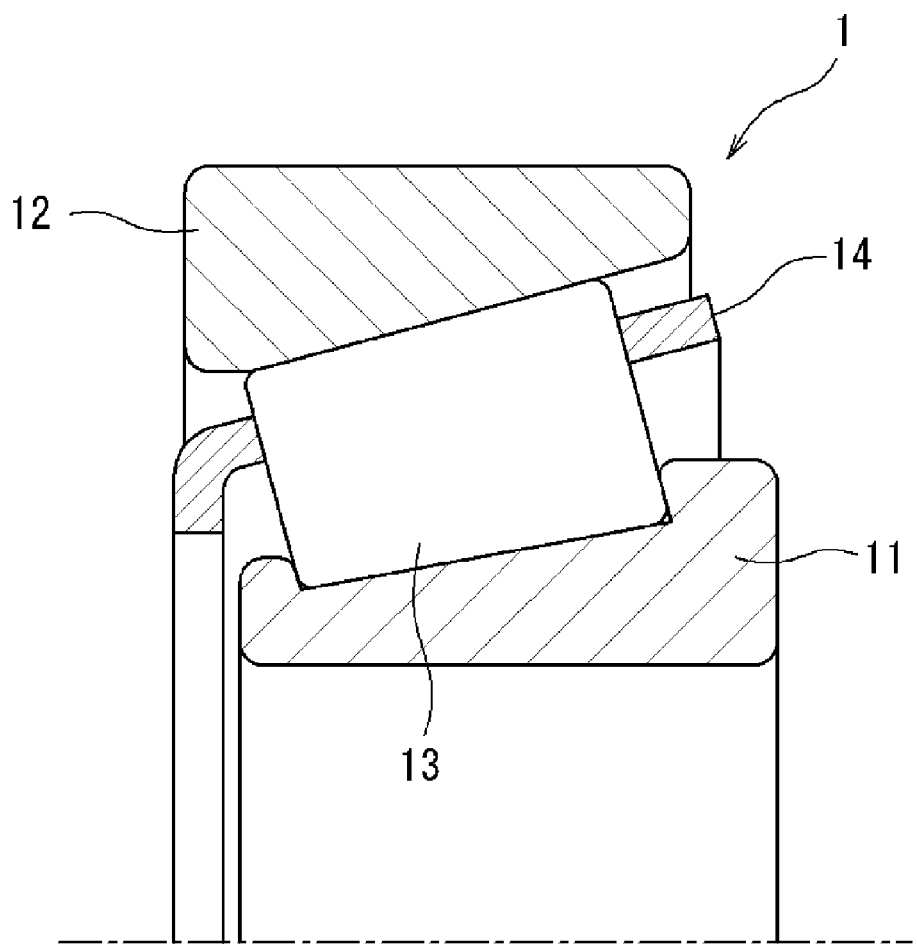
FIG. 1 is a cross-sectional view of a rolling bearing including bearing rings which are formed by a roughly shaped material for bearing rings which is produced by a production method according to an embodiment of the invention.

FIG. 1 is a cross-sectional view of a rolling bearing including bearing rings which are formed by a roughly shaped material for bearing rings which is produced by a production method according to an embodiment of the invention. Furthermore, in this embodiment, description will be given of a conical roller bearing as an example of the rolling bearing, but the invention is not limited to the example. In addition, in this embodiment, description will be given of a roughly shaped material for formation of bearing rings (an inner ring and an outer ring) of the rolling bearing as an example of the roughly shaped material. However, the invention is not limited to the example, and is also applicable to a roughly shaped material for formation of a rolling body (roller, ball).

A rolling bearing 1 shown in FIG. 1 includes an inner ring 11, an outer ring 12, a plurality of rollers (rolling bodies) 13 which are arranged between the inner and outer rings 11 and 12, and a retainer 14 that retains the plurality of rollers 13. The inner ring 11 and the outer ring 12 of the rolling bearing 1 are formed from a roughly shaped material for bearing rings (a roughly shaped material for an inner ring and a roughly shaped material for an outer ring) which is produced by the production method of the invention.

Figure 2:
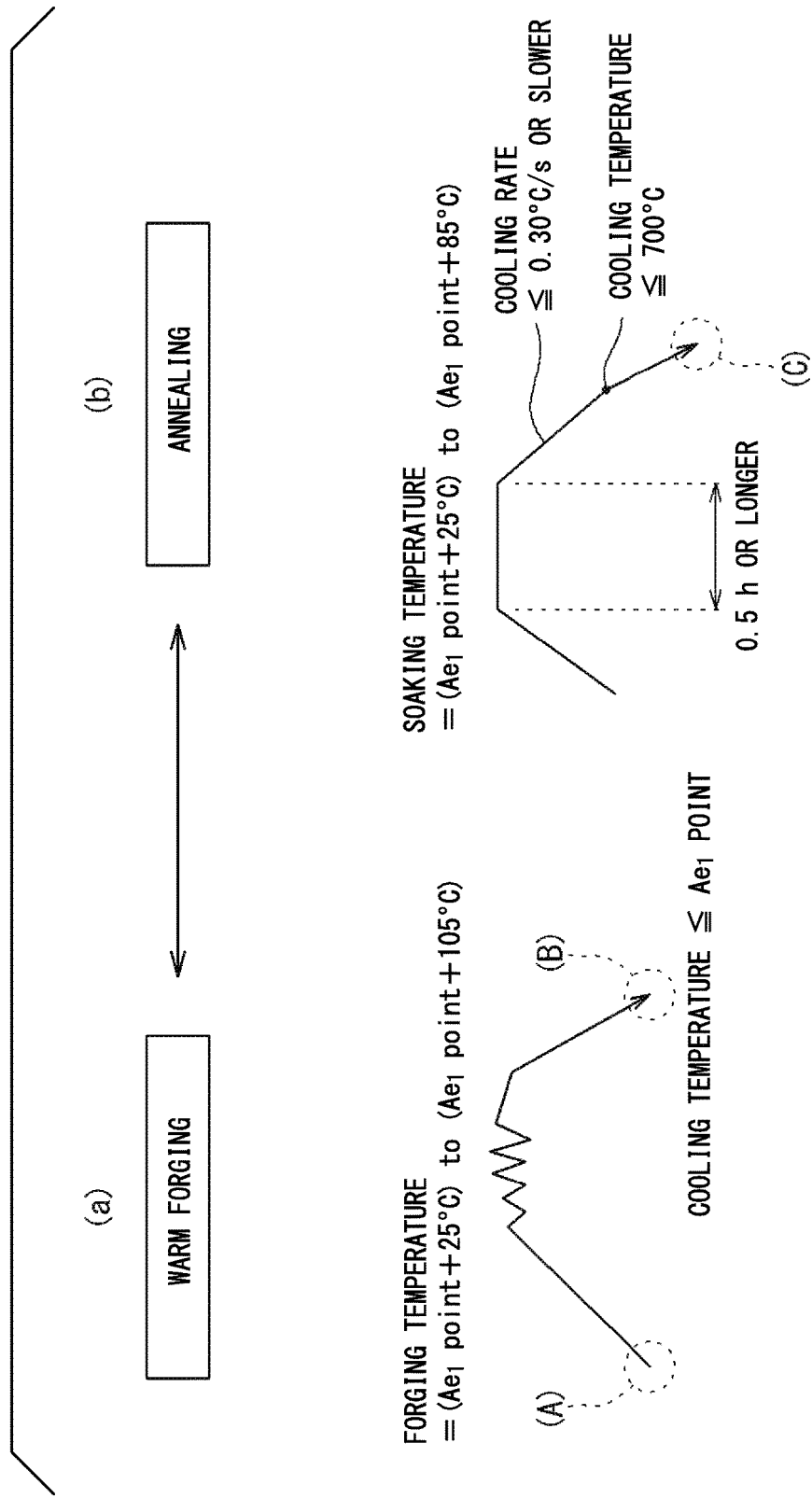
FIG. 2 is a process diagram showing a sequence and heat treatment conditions of the production method according to the embodiment of the invention.
Figure 3:
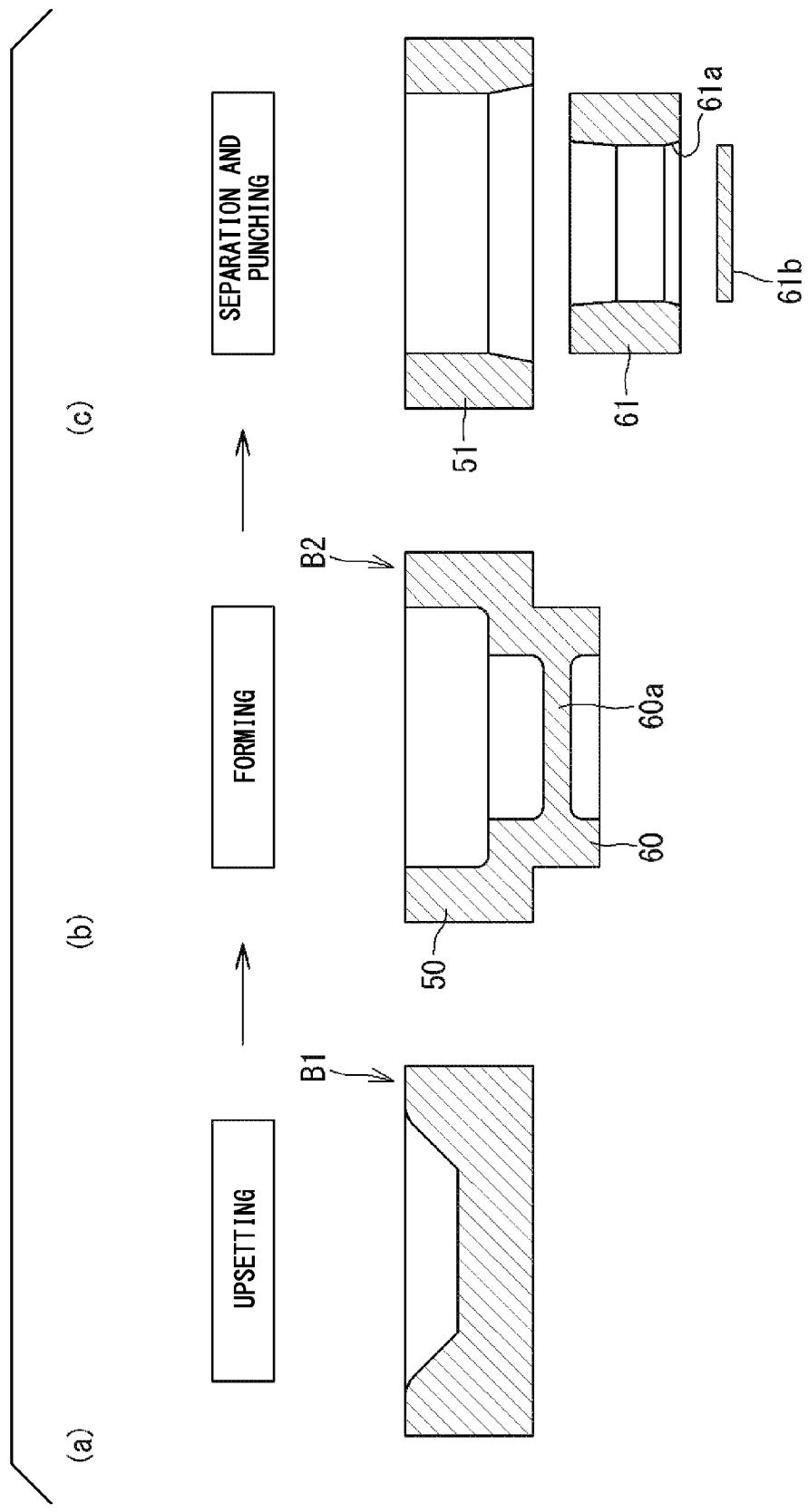
FIG. 3 is a process diagram showing a sequence of a warm forging process in the production method according to the embodiment of the invention.

FIG. 2 is a process diagram showing a sequence and heat treatment conditions of the production method according to the embodiment of the invention, FIG. 3 is a process diagram showing a sequence of a warm forging process in the production method according to the embodiment of the invention, and FIG. 4 is a drawing-substituting photograph showing results obtained by observing a structure in each process of the production method according to the embodiment of the invention. In FIG. 4, a scale bar represents 10 μm.

The production method according to the embodiment of the invention includes (A) forging a steel composed of a high-carbon chrome bearing steel containing 0.7 mass % to 1.2 mass % of a carbon, and 0.8 mass % to 1.8 mass % of a chromium to a predetermined shape while heating the steel to a forging temperature in a range of ($Ae_1$ point+25° C.) to ($Ae_1$ point+105° C.), and cooling a forged article to a temperature of $Ae_1$ point or lower (refer to (a) "warm forging process" in FIG. 2), and (B) performing an annealing in which the forged article obtained in the process (A) is heated to a soaking temperature in a range of ($Ae_1$ point+25° C.) to ($Ae_1$ point+85° C.), and the forged article is retained for 0.5 hours or longer, and cooling the forged article to 700° C. or lower at a cooling rate of 0.30° C./s or slower (refer to (b) "annealing process" in FIG. 2). Furthermore, in this specification, "$Ae_1$ point" represents an equilibrium temperature (austenitizing temperature) that defines the lower limit presence of austenite. Hereinafter, respective processes will be described.

(Warm Forging Process)

In the warm forging process, first, steel composed of high-carbon chrome bearing steel containing 0.7 mass % to 1.2 mass % of carbon, and 0.8 mass % to 1.8 mass % of chromium is heated until a temperature of the central portion of the steel reaches a forging temperature in a range of ($Ae_1$ point+25° C.) to ($Ae_1$ point+105° C.) (refer to (a) in FIG. 2).

Examples of the steel composed of high-carbon chrome bearing steel include steel composed of high-carbon chrome bearing steel containing 0.7 mass % to 1.2 mass % of carbon, 0.8 mass % to 1.8 mass % of chromium, 0.15 mass % to 0.35 mass % of silicon, 0.25 mass % to 0.50 mass % of manganese, 0.025 mass % or less of phosphorous, 0.008 mass % or less of sulfur, and a remainder including iron and unavoidable impurities.

The amount of carbon contained in the steel is 0.7 mass % or greater from the viewpoint of securing fatigue life sufficient for usage as a bearing ring by increasing the amount of cementite in the roughly shaped material for bearing rings, and is preferably 0.98 mass % or greater. In addition, the amount of carbon is 1.2 mass % or less from the viewpoint of securing satisfactory machinability during manufacturing of the bearing rings, and preferably 1.05 mass % or less.

The amount of chromium contained in the steel is 0.8 mass % or greater from the viewpoint of securing hardenability of steel and thermal stability of cementite, and preferably 1.4 mass % or greater. In addition, the amount of chromium is 1.8 mass % or less from the viewpoints of suppressing quenching cracks during quenching, and preventing a decrease in mechanical properties, and preferably 1.6 mass % or less.

The amount of silicon contained in the steel is preferably 0.15 mass % or greater from the viewpoint of securing rolling fatigue life sufficient for usage as the bearing ring, and is preferably 0.35 mass % or less from the viewpoint of improving heat treatment efficiency during manufacturing of the bearing ring.

The amount of manganese contained in the steel is preferably 0.25 mass % or greater from the viewpoint of securing hardenability of steel.

Phosphorous in the steel is an impurity. According to this, the amount of phosphorous contained in the steel is preferably 0.025 mass % or less from the viewpoint of securing toughness or from the viewpoint of rolling fatigue life, and is more preferably 0.015 mass % or less. The smaller the amount of phosphorous contained in the steel is, the more preferable it is. Accordingly, the lower limit of the amount of phosphorous contained in the steel may be 0 mass %. However, it is not technically easy to reduce the amount of phosphorous to 0 mass %. In addition, the steel-making cost increases for stable reducing of the amount of phosphorous to less than 0.001 mass %. Accordingly, the lower limit of the amount of phosphorus contained in the steel may be set to 0.001 mass %.

Sulfur in the steel is an impurity. According to this, the amount of sulfur contained in the steel is preferably 0.008 mass % or less from the viewpoint of improving rolling fatigue life, and more preferably 0.005 mass % or less. The smaller the amount of sulfur contained in the steel is, the more preferable. However, it is not easy to reduce the amount of sulfur to 0 mass % from the viewpoint of a steel-making technology, and the steel-making cost increases for stable reducing to less than 0.001 mass %. Accordingly, the lower limit of the amount of sulfur contained in the steel may be set to 0.001 mass %.

Examples of unavoidable impurities other than phosphorous and sulfur include nickel, copper, aluminum, nitrogen, oxygen, and the like.

The amount of nickel contained in the steel is 0.25 mass % or less. Furthermore, it is preferable that the lower limit of the amount of nickel contained in the steel is a certain degree of amount capable of being regarded as an unavoidable impurity. Typically, the lower limit is preferably 0 mass %.

Furthermore, the amount of iron contained in the steel is the remainder excluding the respective amounts of carbon, silicon, manganese, chromium, phosphorous, sulfur, and the unavoidable impurities from the entire composition of the steel, and is typically 96 mass % to 99 mass %.

The forging temperature is ($Ae_1$ point+25° C.) or higher from the viewpoints of suppressing formation of sheet-shaped or layered cementite by promoting decomposition of cementite, and promoting formation of fine spheroidal cementite, and preferably ($Ae_1$ point+35° C.) or higher. At the forging temperature, plastic working is performed to apply at least 0.5 equivalent strain. On the other hand, the forging temperature is ($Ae_1$ point+105° C.) or lower from the viewpoint of suppressing dissolution of a carbide and from the viewpoint of promoting processing-induced precipitation of the spheroidal cementite in accordance with the plastic working, and preferably ($Ae_1$ point+95° C.) or lower. Specifically, the forging temperature is 760° C. or higher from the viewpoint of promoting decomposition of layered cementite (lamella cementite) in steel before heating, and promoting formation of fine spheroidal cementite, and preferably 770° C. or higher. On the other hand, the forging temperature is 840° C. or lower from the viewpoints of suppressing dissolution of the spheroidal cementite, and promoting processing-induced precipitation of the spheroidal cementite, and preferably 830° C. or lower. Furthermore, in this specification, the "forging temperature" represents a forging temperature at the central portion of steel. In addition, in this specification, the "equivalent strain" represents an average value of an equivalent plastic strain that is applied to steel. The equivalent plastic strain can be obtained by converting a strain in a cross-section that is deformed through forging into a plastic strain of uniaxial stretching in accordance with a method described in page 113 of "Revised industrial plastic mechanics" by MASUDA et al., (Feb. 20, 1995, Fifteenth edition, published by yokendo co. ltd.). Furthermore, an average value of the equivalent plastic strain that is applied to steel can be obtained by a finite element method.

A temperature rising rate when heating steel to the forging temperature may be in a range capable of forming fine spheroidal cementite, and can be appropriately determined in accordance with a composition of steel, a micro structure state, and the like.

When a temperature at the central portion of steel reaches the forging temperature, forging is initiated. Forging is performed under the forging temperature condition (refer to (a) in FIG. 2). As described above, when forging is performed at a forging temperature in a range of ($Ae_1$ point+25° C.) to ($Ae_1$ point+105° C.), dislocation, which is introduced to the inside of a crystal of a steel structure is less likely to disappear, and the dislocation is integrated to the vicinity of a grain boundary of austenite or the vicinity of residual cementite. Accordingly, precipitation of spheroidal cementite, that is, processing-induced precipitation is promoted. For occurrence of the processing-induced precipitation, plastic working for application of at least 0.5 of equivalent strain is necessary. For example, forging can be performed by a process including an upsetting process (refer to (a) in FIG. 3), a forming process (refer to (b) in FIG. 3), and a separation and punching process (refer to (c) in FIG. 3).

In the upsetting process, cylindrical steel (not shown) composed of the high-carbon chrome bearing steel is set on an upsetting device (not shown), and compression is performed from both sides of the cylindrical steel in an axial direction to perform upsetting forming, thereby obtaining a disk member B1 (refer to (a) in FIG. 3).

Next, in the forming process, the disk member B1 is subjected to plastic deformation by using a die including a male tool and a female tool (not shown) to obtain a formed blank B2 having an outer tubular portion 50, an inner tubular portion 60, and a bottom portion 60a that is formed at a lower side of the inner tubular portion 60 (refer to (b) in FIG. 3).

Then, in the separation and punching process, the inner tubular portion 60 of the formed blank B2 is punched by using a punch (not shown), and the bottom portion 60a of the inner tubular portion 60 is punched by using the punch, thereby separating a forged article 51 for an outer ring and a forged article 61 for an inner ring from each other, and separating the forged article 61 for an inner ring and the bottom portion 61b from each other to form a prepared hole 61a in the forged article 61 for an inner ring (refer to (c) in FIG. 3).

After termination of forging, a forged article that is obtained is cooled down to a temperature (cooling temperature) of $Ae_1$ point or lower (refer to (a) in FIG. 2). As described above, when the forged article that is obtained is cooled down to the cooling temperature, it is possible to efficiently form fine spheroidal cementite. The cooling temperature is $Ae_1$ point or lower, and is preferably 400° C. or lower, from the viewpoint of completely completing transformation of an austenite structure after termination of forging so as to suppress formation of a pearlite structure and formation of a martensite structure or a bainite structure which is an overcooled structure. In addition, the cooling temperature is preferably room temperature (25° C.) or higher from the viewpoints of reducing a load on cooling facilities, improving production efficiency, and reducing production cost.

A cooling rate when steel is cooled down to the cooling temperature can be appropriately determined in accordance with a composition of steel, a forging shape, and the like. Furthermore, in this specification, the "cooling temperature" represents a cooling temperature at the central portion of steel.

Through the warm forging process, it is possible to form a structure (refer to step (B) in FIG. 2, and FIG. 4(B)) in which fine spheroidal cementite is dispersed after the warm forging process (step (B) in FIG. 2) from a structure (refer to FIG. 4(A)) that includes pearlite before the warm forging process (step (A) in FIG. 2).

(Annealing Process)

In the annealing process, first, the forged article, which is obtained in the warm forging process, is heated until the temperature of the central portion of the forged article reaches a soaking temperature in a range of ($Ae_1$ point+25° C.) to ($Ae_1$ point+85° C.) (refer to (b) in FIG. 2).

The soaking temperature is ($Ae_1$ point+25° C.) or higher, and is preferably ($Ae_1$ point+35° C.) or higher, from the viewpoint of obtaining a roughly shaped material capable of stably securing satisfactory machinability. In addition, the soaking temperature is ($Ae_1$ point+85° C.) or lower, and is preferably ($Ae_1$ point+75° C.) or lower, from the viewpoint of suppressing formation of sheet-shaped or layered cementite. Specifically, the soaking temperature is 760° C. or higher, and is preferably 770° C. or higher, from the viewpoint of obtaining a roughly shaped material capable of securing satisfactory machinability. The soaking temperature is 820° C. or lower, and is preferably 810° C. or lower, from the viewpoint of suppressing formation of sheet-shaped or layered cementite. Furthermore, in this specification, the "soaking temperature" represents a soaking temperature at the central portion of steel.

A temperature rising rate when heating steel to the soaking temperature can be appropriately determined in accordance with a composition of steel, a forging shape, and the like.

When a temperature at the central portion of the forged article reaches a soaking temperature in a range of ($Ae_1$ point+25° C.) to ($Ae_1$ point+85° C.), the forged article is retained at the soaking temperature for 0.5 hours or longer (refer to (b) in FIG. 2).

The time (soaking time) for retention at the soaking temperature is preferably 1.0 hour or longer from the viewpoint of obtaining a roughly shaped material capable of stably securing satisfactory machinability. Furthermore, even when the soaking time is lengthened to be longer than 10 hours, an additional improvement in characteristics of the roughly shaped material, which corresponds to a period of the soaking time, is not exhibited. Therefore, it is preferable that the soaking time is as shorter as possible from the viewpoint of shortening the production time. The upper limit of the soaking time is typically 5.0 hours or shorter.

After the forged article is retained at the soaking time for 0.5 hours or longer, the forged article is cooled down to a cooling temperature of 700° C. or lower at a cooling rate of 0.30° C./s or slower (refer to (b) in FIG. 2).

The cooling rate is preferably 0.007° C./s or faster, and is more preferably 0.020° C./s or faster, from the viewpoint of improving productivity (shortening of production time). In addition, the cooling rate is 0.30° C./s or slower, is preferably 0.27° C./s or slower, and is more preferably 0.25° C./s or slower, from the viewpoint of suppressing formation of sheet-shaped or layered cementite.

The cooling temperature is 700° C. or lower, and is preferably 650° C. or lower, from the viewpoint of suppressing formation of sheet-shaped or layered cementite. In addition, the cooling temperature is preferably room temperature (25° C.) or higher from the viewpoints of reducing a load on cooling facilities, improving production efficiency, and of reducing the production cost.

Through the annealing process, fine spheroidal cementite (refer to FIG. 4(B)) is allowed to efficiently grow in a structure after the warm forging process (step (B) in FIG. 2). Accordingly, it is possible to form a structure (refer to FIG. 4(C)) in which the spheroidal cementite is dispersed after the annealing process (step (C) in FIG. 2).

In this manner, it is possible to obtain a roughly shaped material for bearing rings of a rolling bearing.

EXAMPLES

Next, the effect of a rolling member and a method of manufacturing the rolling member according to the embodiment of the invention will be verified with reference to examples and the like.

Experiment Example 1

Steel ($Ae_1$=735° C.) composed of high-carbon chrome bearing steel A (composition: 0.98 mass % of carbon, 1.48 mass % of chromium, 0.25 mass % of silicon, 0.45 mass % of manganese, 0.012 mass % of phosphorous, 0.006 mass % of sulfur, and a remainder including iron and unavoidable impurities) was forged and annealed under conditions shown in Table 1, thereby obtaining test pieces (model number: 6208) of a roughly shaped material for bearing rings in Experiment Nos. 1 to 17.

[Table 1]

Test Example 1

Vickers hardness at 55 sites among the test pieces of Experiment Nos. 1 to 17 was measured in accordance with JIS Z 2244, and an average value of the Vickers hardness measured at the 55 sites was obtained. In addition, 5 mass % of picral etchant was brought into contact with the central portion of each of the test pieces of Experiment Nos. 1 to 17 for 10 seconds to corrode the central portion, and then a corroded surface was observed with a scanning electron microscope (product name: EPMA-1600, manufactured by Shimadzu Corporation). Next, an evaluation of hardness and structure spheroidizing, and an overall evaluation were performed for the respective test pieces. The results thereof are shown in Table 2. Furthermore, the evaluation standards for the hardness and the structure spheroidizing, and for the overall evaluation of each of the respective test pieces are as follows.

(Evaluation Standards for Hardness)
Good: Vickers hardness is Hv240 or less.
Poor: Vickers hardness is greater than Hv240.
(Evaluation Standards for Structure Spheroidizing)
Good: Sheet-shaped or layered cementite is not shown, and spheroidal cementite is uniformly dispersed in a structure.
Poor: Sheet-shaped or layered cementite is shown.
(Evaluation Standards for Overall Evaluation)
Good: Evaluation of the hardness and the evaluation of the structure spheroidizing are good.
Poor: At least one of the evaluation of the hardness and of the evaluation of the structure spheroidizing is poor.

[Table 2]

From results shown in Table 2, in a case where the following conditions were satisfied (Experiment Nos. 1 to 3, 6, 10, 11, and 13 to 15), that is, in a case where the forging temperature was in a range of ($Ae_1$ point+25° C.) to ($Ae_1$ point+105° C.), the cooling temperature after forging was $Ae_1$ point or lower, the soaking temperature during annealing was in a range of ($Ae_1$ point+25° C.) to ($Ae_1$ point+85° C.), the soaking time was 0.5 hours or longer, the cooling rate after soaking was 0.30° C./s or slower, and the cooling temperature was 700° C. or lower, it could be seen that all of the test pieces which were obtained had Vickers hardness of Hv240 or less (hardness capable of stably obtaining satisfactory machinability), and had a structure in which sheet-shaped or layered cementite was not shown and spheroidal cementite was uniformly dispersed, and thus hardness and structure spheroidizing were suitable for the roughly shaped material for bearing rings. In contrast, in a case where the above-described conditions were not satisfied, that is, in a case where the soaking temperature was $Ae_1$ point+5° C. (Experiment No. 12), $Ae_1$ point+105° C. (Experiment No. 16), or $Ae_1$ point+135° C. (Experiment No. 17), the soaking time was 0 hour (Experiment No. 9), the cooling temperature after soaking was 730° C. (Experiment No. 4) or 780° C. (Experiment No. 5), the cooling rate after soaking was 0.50° C./s (Experiment No. 7), and the cooling rate after soaking was 1.50° C./s (Experiment No. 8), it could be seen that at least one of hardness and structure spheroidizing of the test pieces was not suitable for the roughly shaped material for bearing rings.

Even in a case using steel composed of high-carbon chrome bearing steel B ($Ae_1$=735° C.) containing 1.0 mass % of carbon, 1.5 mass % of chromium, 0.3 mass % of silicon, 0.45 mass % of manganese, 0.01 mass % of phosphorous, 0.005 mass % of sulfur, and a remainder including iron and unavoidable impurities, high-carbon chrome bearing steel C ($Ae_1$=735° C.) containing 0.8 mass % of carbon, 1.4 mass % of chromium, 0.2 mass % of silicon, 0.4 mass % of manganese, 0.005 mass % of phosphorous, 0.004 mass % of sulfur, and a remainder including iron and unavoidable impurities, or high-carbon chrome baring steel D ($Ae_1$=745° C.) containing 0.9 mass % of carbon, 1.7 mass % of chromium, 0.2 mass % of silicon, 0.45 mass % of manganese, 0.005 mass % of phosphorous, 0.005 mass % of sulfur, and a remainder including iron and unavoidable impurities instead of steel composed of the high-carbon chrome bearing steel A, it could be seen that the same tendency as in steel composed of high-carbon chrome bearing steel A was shown.

Experiment Example 2

Steel ($Ae_1=735°$ C.) composed of high-carbon chrome bearing steel (composition: 0.98 mass % of carbon, 1.48 mass % of chromium, 0.25 mass % of silicon, 0.45 mass % of manganese, 0.012 mass % of phosphorous, 0.006 mass % of sulfur, and a remainder including iron and unavoidable impurities) was forged and annealed under conditions shown in Table 3, thereby obtaining test pieces (model number: 6208) of a roughly shaped material for bearing rings in Experiment Nos. 18 to 41.

[Table 3]

Test Example 2

The Vickers hardness at 55 sites among the test pieces of Experiment Nos. 18 to 19 was measured in accordance with JIS Z 2244, and the average value of the Vickers hardness measured at the 55 sites was obtained. In addition, 5 mass % of picral etchant was brought into contact with the central portion of each of the test pieces of Experiment Nos. 18 and 19 for 10 seconds to corrode the central portion, and then a corroded surface was observed with a scanning electron microscope (product name: EPMA-1600, manufactured by Shimadzu Corporation). Furthermore, the test pieces of Experiment Nos. 18 and 19 were produced under the same conditions except that the temperature rising rates in the annealing process were different from each other.

As a result, it could be seen that all of the test pieces in Experiment Nos. 18 and 19 had a Vickers hardness of Hv240 or less (a hardness capable of obtaining satisfactory machinability), and had a structure in which sheet-shaped or layered cementite was not shown and spheroidal cementite was uniformly dispersed, and thus hardness and structure spheroidizing were suitable for the roughly shaped material for bearing rings (not shown). Accordingly, it is implied that an effect of the temperature rising rate in the annealing process on hardness and a structure state of the roughly shaped material for bearing rings is small.

Test Example 3

Figure 5:
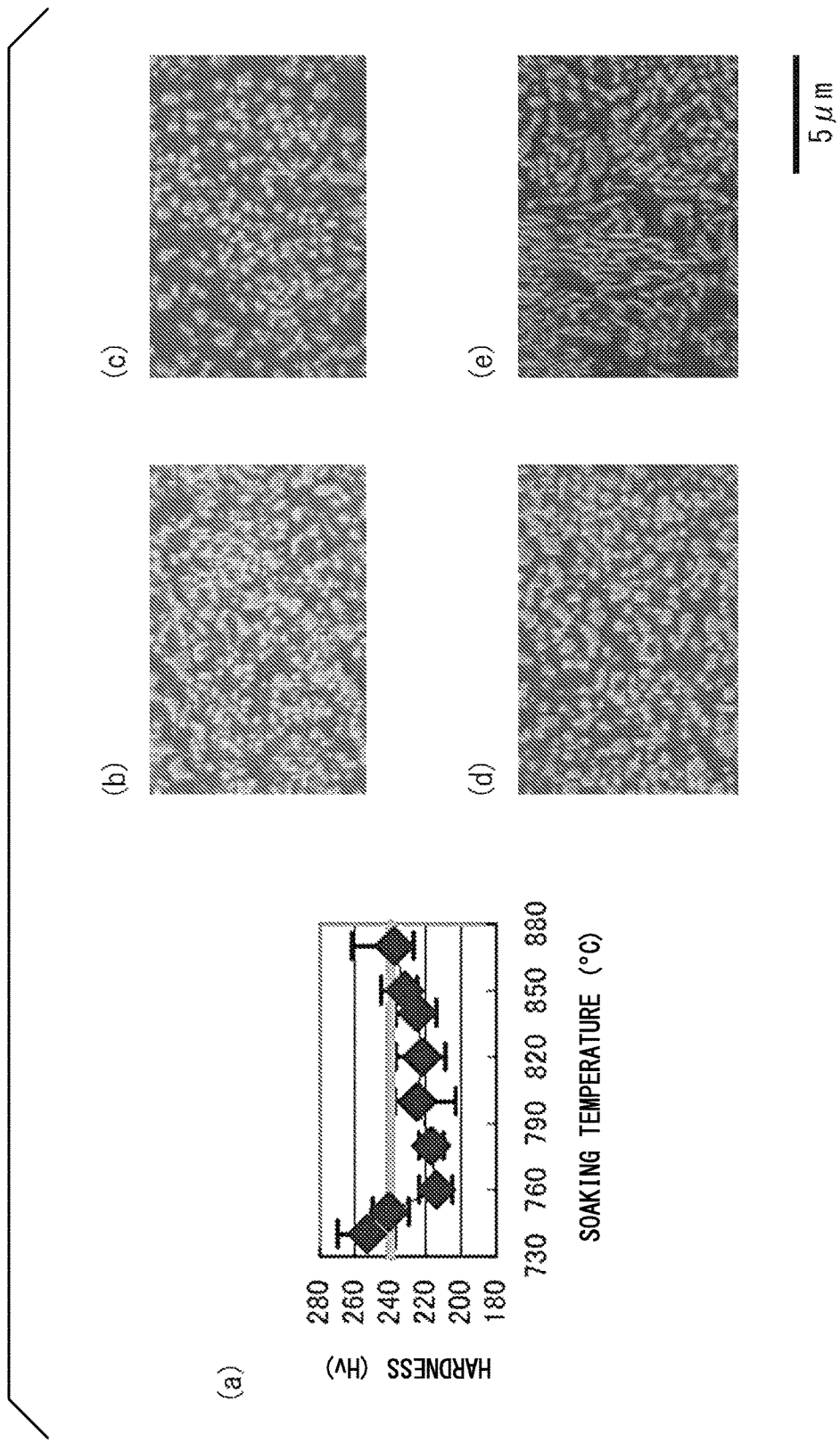
FIG. 5 is a view showing results obtained by investigating a relationship between a soaking temperature and hardness, and results obtained by observing a structure of a roughly shaped material for bearing rings which is obtained after an annealing process in Test Example 3. (a) is a graph showing the results obtained by investigating the relationship between the soaking temperature and the hardness, (b) is a drawing-substituting photograph of the structure of the roughly shaped material for bearing rings when the soaking temperature is set to 740° C., (c) is a drawing-substituting photograph of the structure of the roughly shaped material for bearing rings when the soaking temperature is set to 760° C., (d) is a drawing-substituting photograph of the structure of the roughly shaped material for bearing rings when the soaking temperature is set to 820° C., and (e) is a drawing-substituting photograph of the structure of the roughly shaped material for bearing rings when the soaking temperature is set to 840° C.

Vickers hardness at 55 sites among the test pieces of Experiment Nos. 20 to 27 was measured in accordance with JIS Z 2244, and an average value of the Vickers hardness measured at the 55 sites was obtained. In addition, 5 mass % of picral etchant was brought into contact with the central portion of each of the test pieces of Experiment Nos. 20 to 27 for 10 seconds to corrode the central portion, and then a corroded surface was observed with a scanning electron microscope (product name: EPMA-1600, manufactured by Shimadzu Corporation). Furthermore, the test pieces of Experiment Nos. 20 and 27 were produced under the same conditions except that soaking temperatures in the annealing process were different from each other. In Test Example 3, results obtained by investigating a relationship between the soaking temperature and the hardness, and results obtained by observing the structure of the roughly shaped material for bearing rings which was obtained after the annealing process are shown in FIG. 5. In FIG. 5, (a) is a graph showing the results obtained by investigating the relationship between the soaking temperature and the hardness, (b) is a drawing-substituting photograph of the structure of the roughly shaped material for bearing rings when the soaking temperature is set to 740° C., (c) is a drawing-substituting photograph of the structure of the roughly shaped material for bearing rings when the soaking temperature is set to 760° C., (d) is a drawing-substituting photograph of the structure of the roughly shaped material for bearing rings when the soaking temperature is set to 820° C., and (e) is a drawing-substituting photograph of the structure of the roughly shaped material for bearing rings when the soaking temperature is set to 840° C. In the drawing, the scale bar represents 5 μm.

As shown in FIG. 5, in a case where the soaking temperature is 760° C. to 820° C. (($Ae_1$ point+25° C.) to ($Ae_1$ point+85° C.)) (Experiment Nos. 22 to 25), it could be seen that all of the test pieces which were obtained had a Vickers hardness of Hv240 or less (a hardness capable of obtaining satisfactory machinability), and tended to have a structure in which sheet-shaped or layered cementite was not shown and spheroidal cementite was uniformly dispersed, and thus all of the hardness and structure spheroidizing were suitable for the roughly shaped material for bearing rings. In contrast, in a case where the soaking temperature was 740° C. (Experiment No. 20), 750° C. (Experiment No. 21), 840° C. (Experiment No. 26), 850° C. (Experiment No. 27), and 870° C. (Experiment No. 28), Vickers hardness of the test pieces was greater than Hv240 (the hardness at which machinability deteriorates), or the sheet-shaped or layered cementite was shown. Accordingly, from the results, it is implied that the soaking temperature is preferably ($Ae_1$ point+25° C.) to ($Ae_1$ point+85° C.).

Test Example 4

Vickers hardness at 55 sites among the test pieces of Experiment Nos. 29 to 33 was measured in accordance with JIS Z 2244, and an average value of the Vickers hardness measured at the 55 sites was obtained. In addition, 5 mass % of picral etchant was brought into contact with the central portion of each of the test pieces of Experiment Nos. 29 and 33 for 10 seconds to corrode the central portion, and then a corroded surface was observed with a scanning electron microscope (product name: EPMA-1600, manufactured by Shimadzu Corporation). Furthermore, the test pieces of Experiment Nos. 29 to 33 were produced under the same conditions except that the soaking time in the annealing process is different from each other.

As a result, in a case where the soaking time was 0.5 hours (Experiment No. 30), 1 hour (Experiment No. 31), 1.5 hours (Experiment No. 32), and 2 hours (Experiment No. 33), it could be seen that all of the test pieces which were obtained had a Vickers hardness of Hv240 or less (a hardness capable of obtaining satisfactory machinability), and had a structure in which sheet-shaped or layered cementite was not shown and spheroidal cementite was uniformly dispersed, and thus hardness and structure spheroidizing were suitable for the roughly shaped material for bearing rings (not shown). In contrast, in a case where the soaking time was 0 hour (Experiment No. 29), Vickers hardness of the test piece was greater than Hv240 (hardness at which machinability deteriorates) (not shown). Accordingly, from the results, it is implied that the soaking time is preferably 0.5 hours or longer.

Test Example 5

Figure 6:
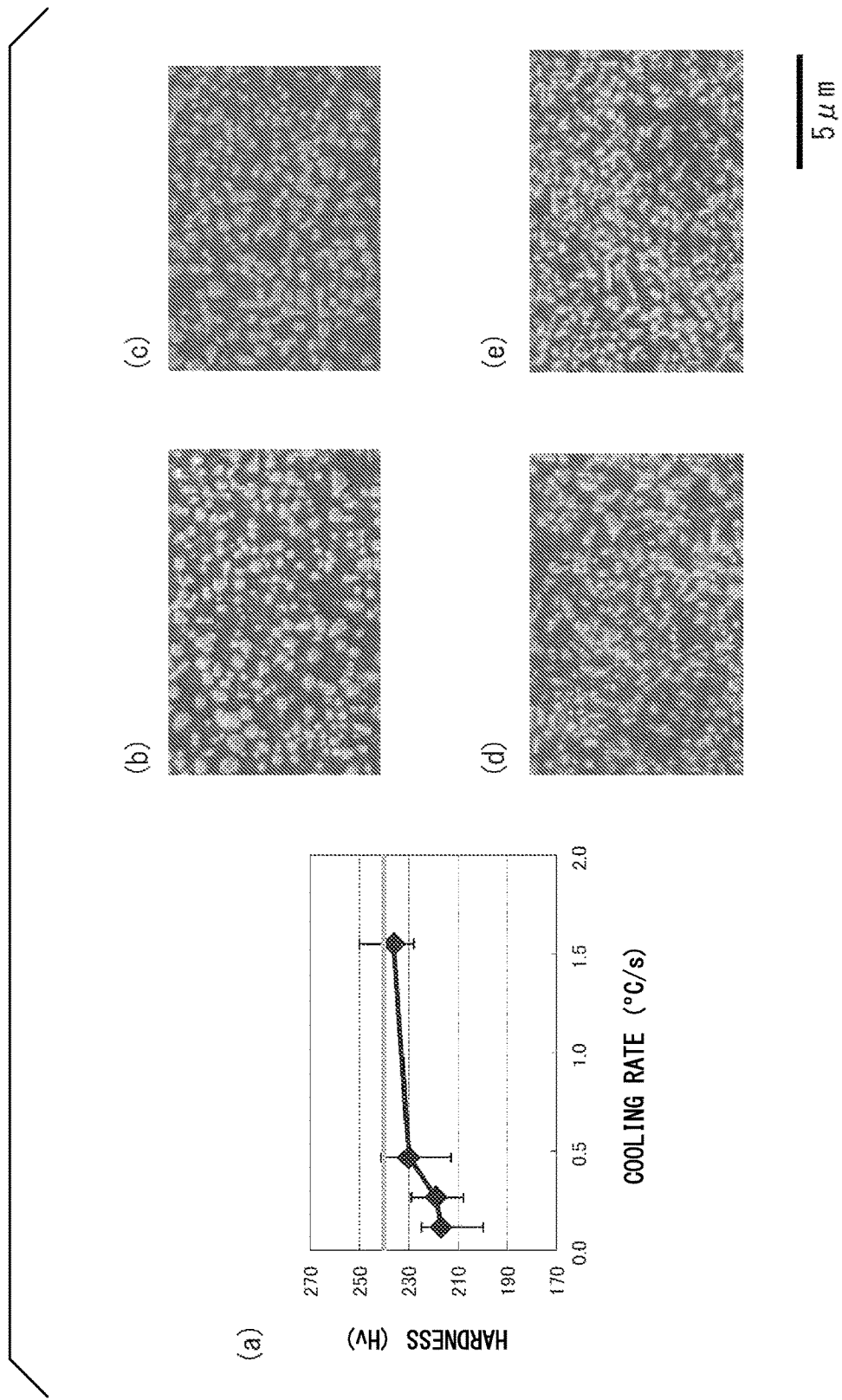
FIG. 6 is a view showing results obtained by investigating a relationship between a cooling rate and hardness, and results obtained by observing a structure of a roughly shaped material for bearing rings which is obtained after an annealing process in Test Example 5. (a) is a graph showing the results obtained by investigating the relationship between the cooling rate and the hardness, (b) is a drawing-substituting photograph of the structure of the roughly shaped material for bearing rings when the cooling rate is set to 7° C./min (0.12° C./s), (c) is a drawing-substituting photograph of the structure of the roughly shaped material for bearing rings when the cooling rate is set to 16° C./min (0.27° C./s), (d) is a drawing-substituting photograph of the structure of the roughly shaped material for bearing rings when the cooling rate is set to 26° C./min (0.43° C./s), and (e) is a drawing-substituting photograph of the structure of the roughly shaped material for bearing rings when the cooling rate is set to 93° C./min (1.55° C./s).

Vickers hardness at 55 sites among the test pieces of Experiment Nos. 34 to 37 was measured in accordance with JIS Z 2244, and the average value of the Vickers hardness measured at the 55 sites was obtained. In addition, 5 mass % of picral etchant was brought into contact with the central portion of each of the test pieces of Experiment Nos. 34 to 37 for 10 seconds to corrode the central portion, and then a corroded surface was observed with a scanning electron microscope (product name: EPMA-1600, manufactured by Shimadzu Corporation). Furthermore, the test pieces of Experiment Nos. 34 and 37 were produced under the same conditions except that the cooling rates in the annealing process were different from each other. In Test Example 5, results obtained by investigating a relationship between the cooling rate and the hardness, and results obtained by observing the structure of the roughly shaped material for bearing rings which was obtained after the annealing process are shown in FIG. 6. In the drawing, (a) is a graph showing the results obtained by investigating the relationship between the cooling rate and the hardness, (b) is a drawing-substituting photograph of the structure of the roughly shaped material for bearing rings when the cooling rate is set to 7° C./min (0.12° C./s), (c) is a drawing-substituting photograph of the structure of the roughly shaped material for bearing rings when the cooling rate is set to 16° C./min (0.27° C./s), (d) is a drawing-substituting photograph of the structure of the roughly shaped material for bearing rings when the cooling rate is set to 26° C./min (0.43° C./s), and (e) is a drawing-substituting photograph of the structure of the roughly shaped material for bearing rings when the cooling rate is set to 93° C./min (1.55° C./s). In the drawing, the scale bar represents 5 μm.

From the results shown in FIG. 6, in a case where the cooling rate was 0.12° C./s (Experiment No. 34) and 0.27° C./s (Experiment No. 35), it could be seen that all of the test pieces which were obtained had Vickers hardness of Hv240 or less (hardness capable of stably obtaining satisfactory machinability), and had a structure in which sheet-shaped or layered cementite was not shown and spheroidal cementite was uniformly dispersed, and thus hardness and structure spheroidizing were suitable for the roughly shaped material for bearing rings. In contrast, in a case where the cooling rate was 1.55° C./s (Experiment No. 37), it could be seen that the Vickers hardness of the test piece was greater than Hv240 (the hardness at which machinability deteriorates), and the sheet-shaped or layered cementite was seen. Accordingly, the results implies that the cooling rate in the annealing process is preferably 0.30° C./s or lower, and is more preferably 0.27° C./s or lower.

Test Example 6

Figure 7:
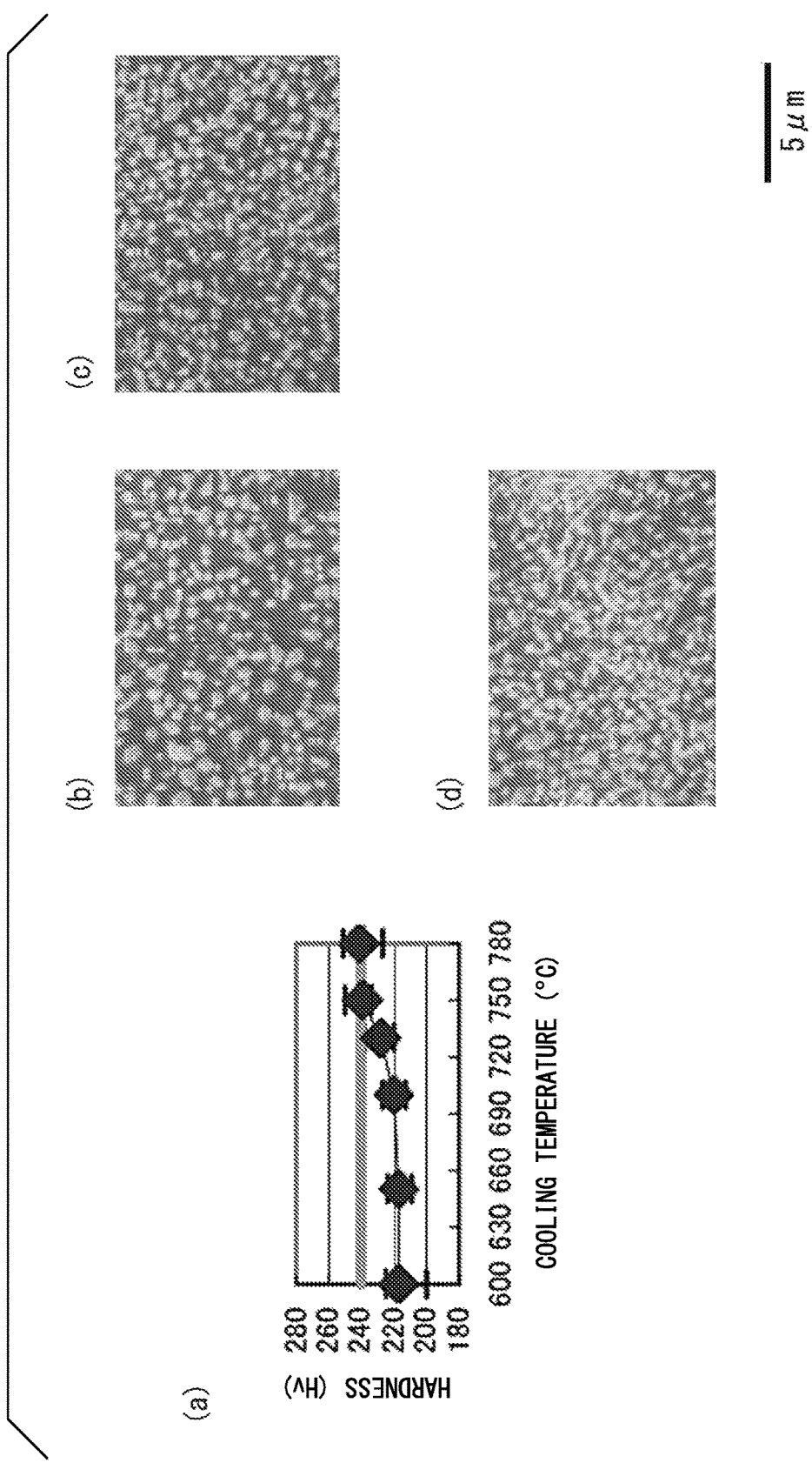
FIG. 7 is a view showing results obtained by investigating a relationship between a cooling temperature and hardness, and results obtained by observing a structure of a roughly shaped material for bearing rings which is obtained after an annealing process in Test Example 6. (a) is a graph showing the results obtained by investigating the relationship between the cooling temperature and the hardness, (b) is a drawing-substituting photograph of the structure of the roughly shaped material for bearing rings when the cooling temperature is set to 650° C., (c) is a drawing-substituting photograph of the structure of the roughly shaped material for bearing rings when the cooling temperature is set to 700° C., and (d) is a drawing-substituting photograph of the structure of the roughly shaped material for bearing rings when the cooling temperature is set to 730° C.

Vickers hardness at 55 sites among the test pieces of Experiment Nos. 38 to 43 was measured in accordance with JIS Z 2244, and an average value of the Vickers hardness measured at the 55 sites was obtained. In addition, 5 mass % of picral etchant was brought into contact with the central portion of each of the test pieces of Experiment Nos. 38 to 43 for 10 seconds to corrode the central portion, and then a corroded surface was observed with a scanning electron microscope (product name: EPMA-1600, manufactured by Shimadzu Corporation). Furthermore, the test pieces of Experiment Nos. 38 and 43 were produced under the same conditions except that the cooling temperature in the annealing process was different from each other. In Test Example 6, results obtained by investigating a relationship between the cooling temperature and the hardness, and results obtained by observing the structure of the roughly shaped material for bearing rings which is obtained after the annealing process are shown in FIG. 7. In the drawing, (a) is a graph showing the results obtained by investigating the relationship between the cooling temperature and the hardness, (b) is a drawing-substituting photograph of the structure of the roughly shaped material for bearing rings when the cooling temperature is set to 650° C., (c) is a drawing-substituting photograph of the structure of the roughly shaped material for bearing rings when the cooling temperature is set to 700° C., and (d) is a drawing-substituting photograph of the structure of the roughly shaped material for bearing rings when the cooling temperature is set to 730° C. In the drawing, a scale bar represents 5 μm.

From the results shown in FIG. 7, in a case where the cooling temperature was 600° C. (Experiment No. 38), 650° C. (Experiment No. 39), and 700° C. (Experiment No. 40), it could be seen that all of the test pieces which were obtained had Vickers hardness of Hv240 or less (hardness capable of obtaining satisfactory machinability), and tended to have a structure in which sheet-shaped or layered cementite was not shown and spheroidal cementite was uniformly dispersed, and thus the hardness and the structure spheroidizing were suitable for the roughly shaped material for bearing rings. In contrast, in a case where the cooling temperature was 750° C. (Experiment No. 42) and 780° C. (Experiment No. 43), it could be seen that there is a tendency where the Vickers hardness of the test pieces was greater than HIV240 (hardness at which machinability deteriorates), and the sheet-shaped or layered cementite was shown. Accordingly, from the results, it is implied that the cooling temperature in the annealing process is preferably 700° C. or lower.

Example 1 and Example 2

Figure 8:
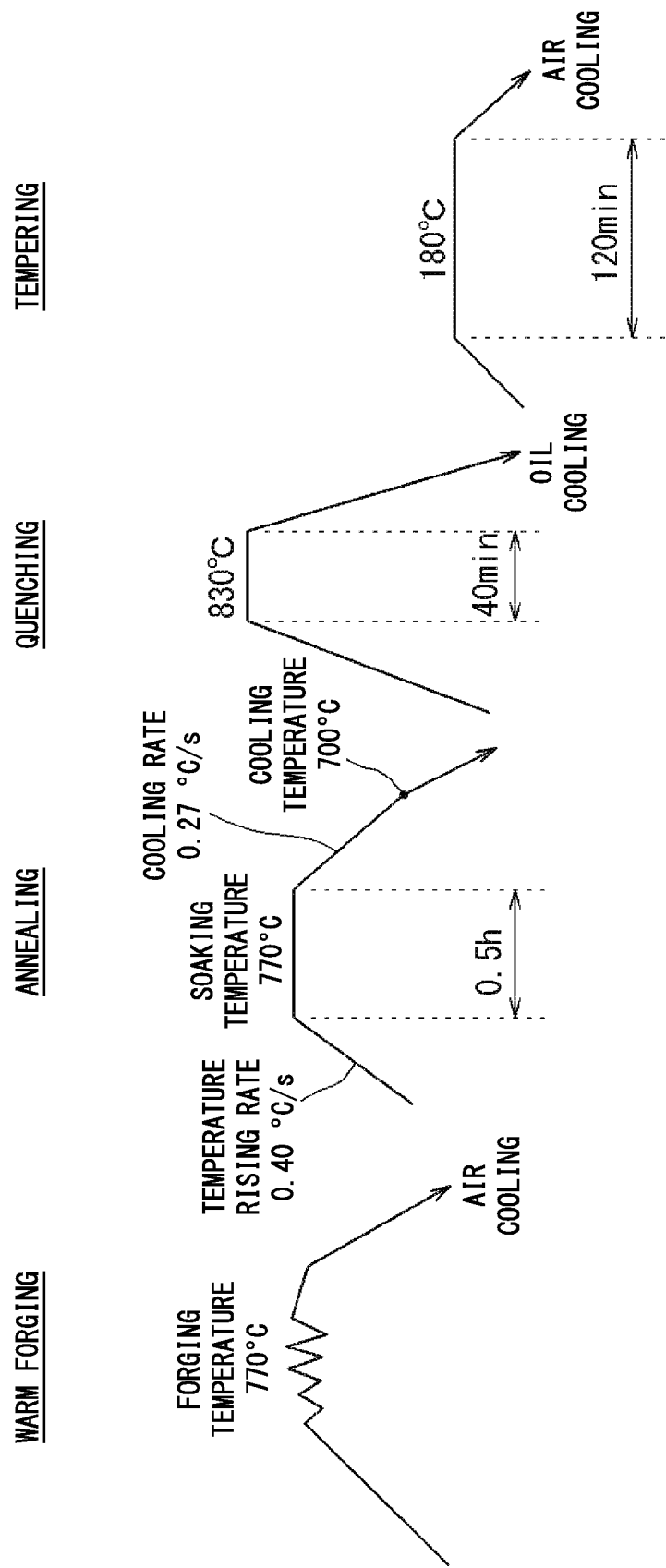
FIG. 8 is a diagram showing heat treatment conditions in Example 1.
Figure 9:
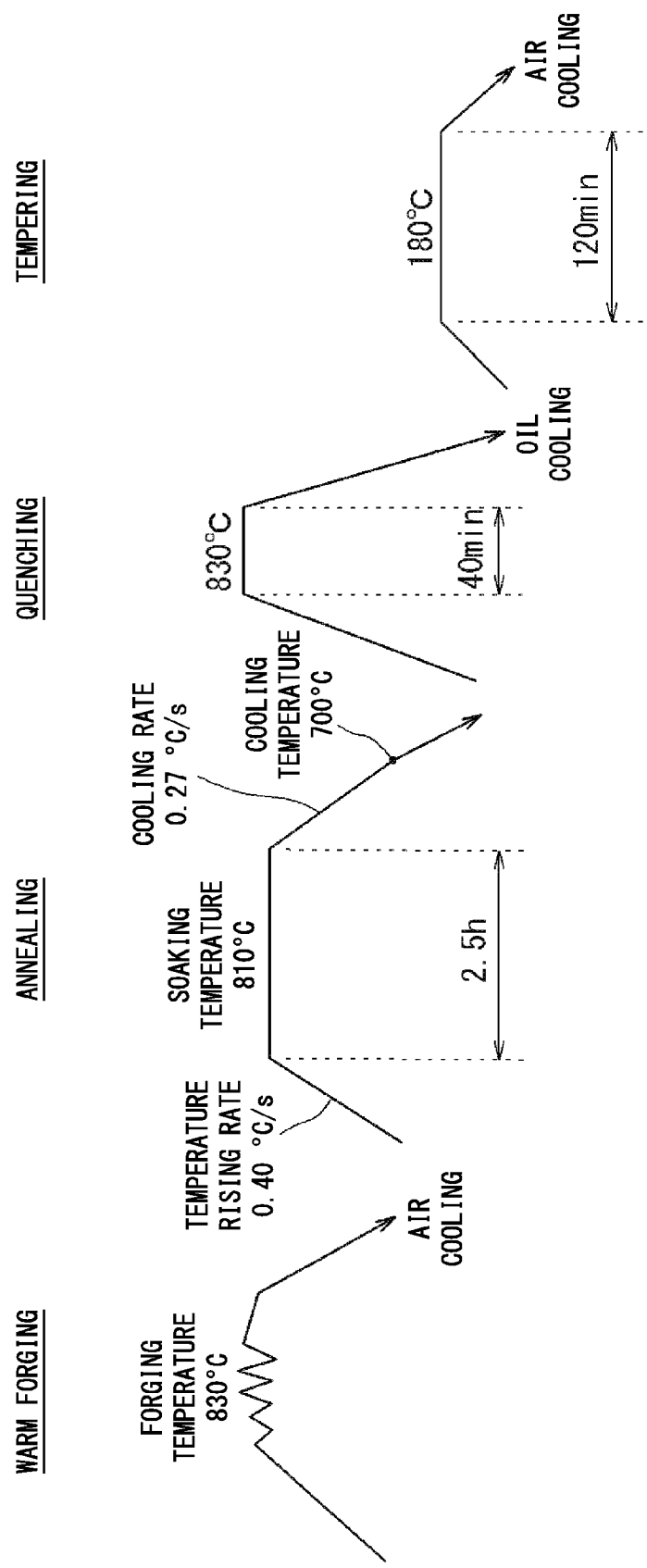
FIG. 9 is a diagram showing heat treatment conditions in Example 2.

Steel ($Ae_1$=735° C.) Composed of high-carbon chrome bearing steel (composition: 0.98 mass % of carbon, 1.48 mass % of chromium, 0.25 mass % of silicon, 0.45 mass % of manganese, 0.012 mass % of phosphorous, 0.006 mass % of sulfur, and a remainder including iron and unavoidable impurities) was forged and annealed under conditions shown in Table 4. Then, the forged articles which were obtained were subjected to a quenching treatment and a tempering treatment under conditions shown in FIG. 8 (Example 1) and under conditions shown in FIG. 9 (Example 2), thereby obtaining test pieces (model number: 6208) of a roughly shaped material for bearing rings.

[Table 4]

Test Example 7

5 mass % of picral etchant was brought into contact with the central portion of each of forged articles after the annealing process in Example 1 and Example 2 for 10 seconds to corrode the central portion, and then a corroded surface was observed with a scanning electron microscope (product name: EPMA-1600, manufactured by Shimadzu Corporation). In addition, the Vickers hardness at 55 sites among the test pieces of Example 1 and Example 2 was measured in accordance with JIS Z 2244, and the average value of the Vickers hardness measured at the 55 sites was obtained. Next, evaluation of hardness of the respective test pieces and structure spheroidizing of the forged articles after the annealing process was performed. In addition, the X-ray diffraction intensity was measured at a surface layer portion and the center portion of the test pieces of the roughly shaped material for bearing rings in Example 1 and Example 2 by an X-ray diffraction method. The X-ray diffraction intensity $I\gamma$ of fcc that is a crystal structure of residual austenite, and the X-ray diffraction intensity $I\alpha$ of bcc that is a crystal structure of a tempered martensite were obtained. From the X-ray diffraction intensity ratio which was obtained, the amount of residual austenite at the surface layer portion and the center portion of the test pieces of the roughly shaped material for bearing rings in Example 1 and 2 was obtained by using the following theoretical Expression (I):

$$1/V\gamma = 1 + (R\gamma/R\alpha) \times (I\alpha/I\gamma) \quad (I)$$

(In Expression, $V\gamma$ represents the amount of residual austenite, $R\gamma$ and $R\alpha$ represent coefficients depending on crystal orientations that is measured, $I\gamma$ and $I\alpha$ represent X-ray diffraction intensities).

Figure 10:
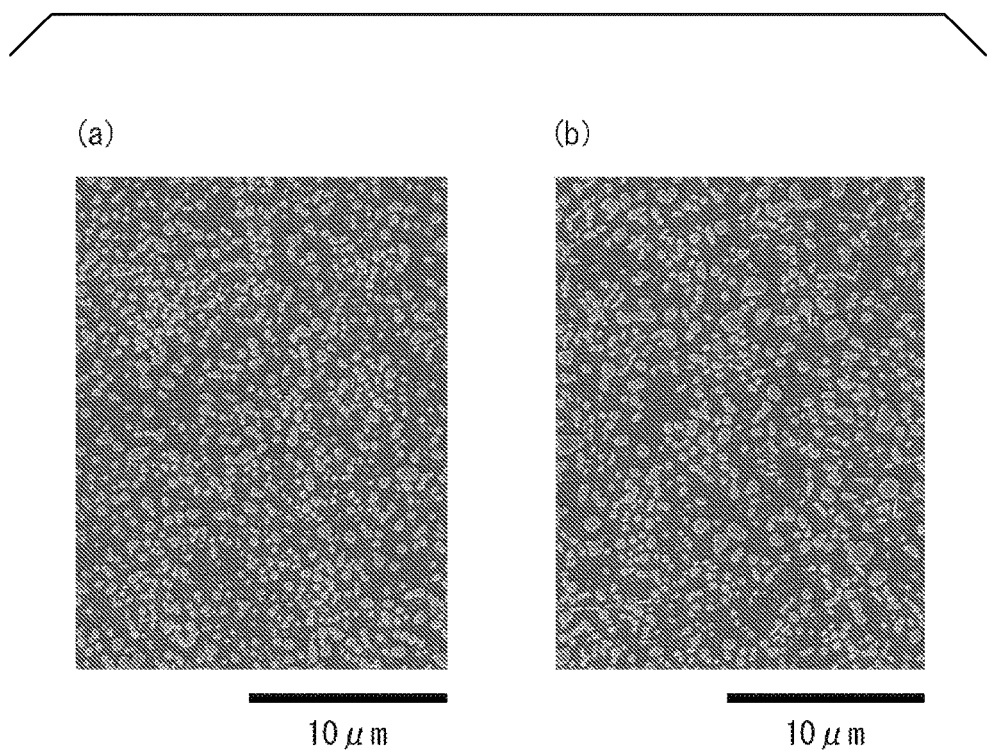
FIG. 10 is a drawing-substituting photograph showing results obtained by observing a structure of a forged article that is obtained after an annealing process in Test Example 7. (a) is a drawing-substituting photograph showing a result obtained by observing a structure of a forged article in Example 1, and (b) is a drawing-substituting photograph showing a result obtained by observing a structure of a forged article in Example 2.
Figure 11:
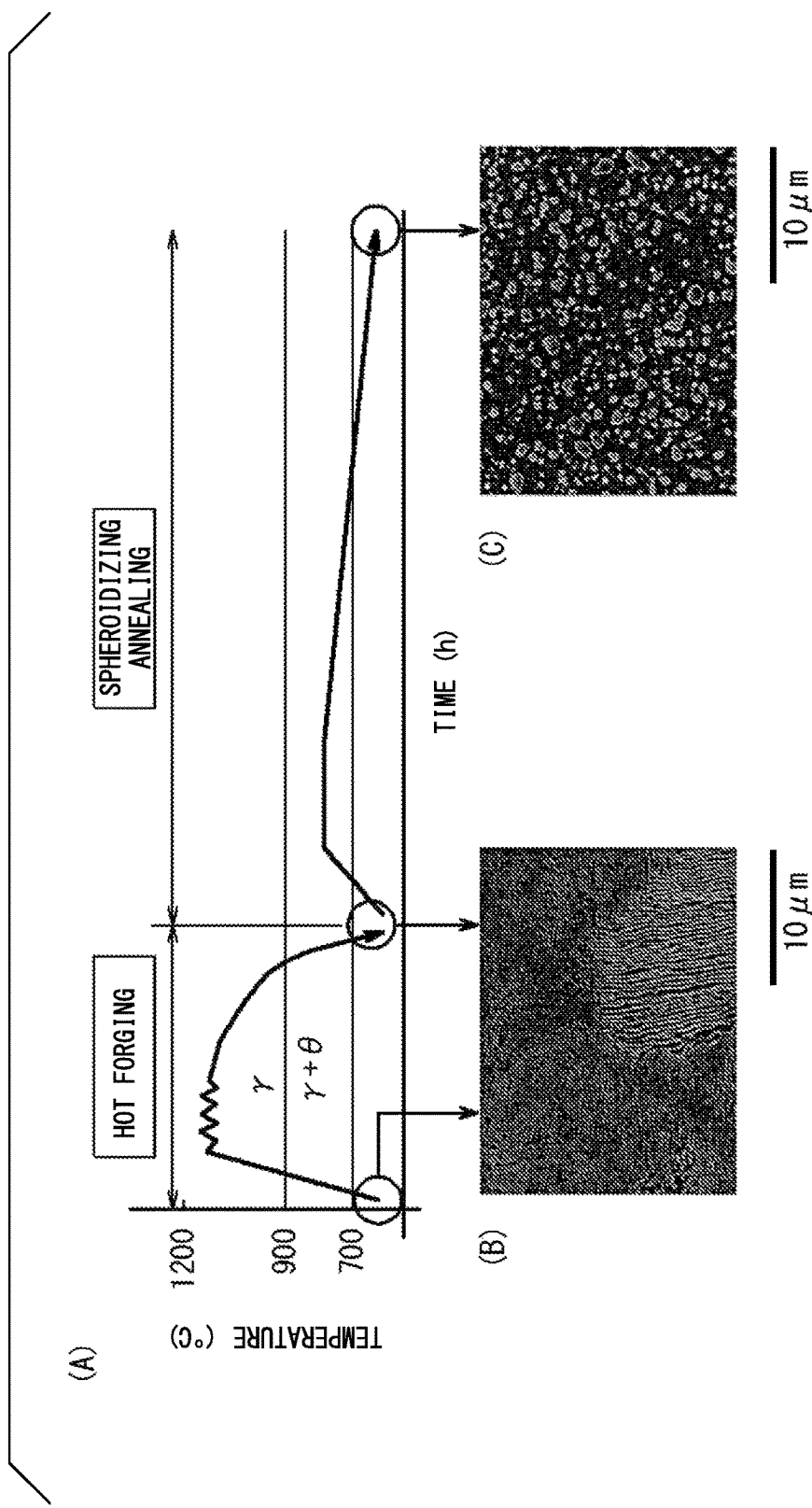
FIG. 11 is a view showing heat treatment conditions in a method of producing a roughly shaped material for bearing rings in the related art in which hot forging is performed, and results obtained by observing a state of a structure in each process.

In test Example 7, results, which are obtained by observing a structure of the forged article obtained after the annealing process, are shown in FIG. 10. In the drawing, (a) is a drawing-substituting photograph showing a result obtained by observing the structure of the forged article in Example 1, and (b) is a drawing-substituting photograph showing a result obtained by observing the structure of the forged article in Example 2. Furthermore, a scale bar in the drawing represents 10 µm. The amount of residual austenite at the surface layer portion and the center portion of the test pieces of the roughly shaped material for bearing rings in Example 1 and Example 2, and results obtained by performing evaluation of the hardness of the respective test pieces and the structure spheroidizing of the forged articles after the annealing process are shown in Table 5. In addition, the evaluation standards for the evaluation of the hardness of the respective test pieces, and the structure spheroidizing of the forged articles obtained after the annealing process are the same as the evaluation standards used in Test Example 1. In addition, a case where the amount of residual austenite was an amount (15 vol % or less), which is suitable for compatibility between securement of rolling fatigue life and securement of dimensional stability in bearing rings of a rolling bearing is regarded as "Good".

[Table 5]

From results shown in FIG. 10 and Table 5, in Example 1 and Example 2 which satisfies conditions in which the forging temperature is in a range of ($Ae_1$ point+25° C.) to ($Ae_1$ point+105° C.), the cooling temperature after forging was $Ae_1$ point or lower, the soaking temperature during annealing was in a range of ($Ae_1$ point+25° C.) to ($Ae_1$ point+85° C.) and the soaking temperature during annealing was in a range of preferably ($Ae_1$ point+35° C.) to ($Ae_1$ point+75° C.), the soaking time was 0.5 hours or longer, the cooling rate after soaking was 0.30° C./s or slower, and the cooling temperature was 700° C. or lower, it can be seen that all of the amount of residual austenite, the hardness, and the structure spheroidizing are in ranges which are suitable for manufacturing of bearing rings.

BRIEF DESCRIPTION OF THE REFERENCE SYMBOLS

1: CONICAL ROLLER BEARING (ROLLING BEARING)
11: INNER RING (BEARING RING)
12: OUTER RING (BEARING RING)

TABLE 1

| | | WARM FORGING PROCESS | | ANNEALING PROCESS | | | | |
|---|---|---|---|---|---|---|---|---|
| EXPERIMENT No. | $Ae_1$ (° C.) | FORGING TEMPERATURE (° C.) | COOLING TEMPERATURE (° C.) | TEMPERATURE RISING RATE (° C./s) | SOAKING TEMPERATURE (° C.) | SOAKING TIME (h) | COOLING RATE (° C./s) | COOLING TEMPERATURE (° C.) |
| 1 | 735 | 820($Ae_1$ + 95) | AIR COOLING | 0.08 | 780($Ae_1$ + 45) | 1.0 | 0.10 | 600 |
| 2 | 735 | 830($Ae_1$ + 95) | AIR COOLING | 0.40 | 780($Ae_1$ + 45) | 1.0 | 0.10 | 600 |
| 3 | 735 | 830($Ae_1$ + 95) | AIR COOLING | 0.40 | 780($Ae_1$ + 45) | 1.0 | 0.10 | 700 |
| 4 | 735 | 830($Ae_1$ + 95) | AIR COOLING | 0.40 | 780($Ae_1$ + 45) | 1.0 | 0.10 | 730 |
| 5 | 735 | 830($Ae_1$ + 95) | AIR COOLING | 0.40 | 780($Ae_1$ + 45) | 1.0 | 0.10 | 780 |
| 6 | 735 | 830($Ae_1$ + 95) | AIR COOLING | 0.40 | 780($Ae_1$ + 45) | 1.0 | 0.25 | 600 |
| 7 | 735 | 830($Ae_1$ + 95) | AIR COOLING | 0.40 | 780($Ae_1$ + 45) | 1.0 | 0.50 | 600 |
| 8 | 735 | 830($Ae_1$ + 95) | AIR COOLING | 0.40 | 780($Ae_1$ + 45) | 1.0 | 1.50 | 600 |
| 9 | 735 | 830($Ae_1$ + 95) | AIR COOLING | 0.40 | 780($Ae_1$ + 45) | 0.0 | 0.10 | 700 |
| 10 | 735 | 830($Ae_1$ + 95) | AIR COOLING | 0.40 | 780($Ae_1$ + 45) | 0.5 | 0.10 | 700 |
| 11 | 735 | 830($Ae_1$ + 95) | AIR COOLING | 0.40 | 780($Ae_1$ + 45) | 1.5 | 0.10 | 700 |
| 12 | 735 | 830($Ae_1$ + 95) | AIR COOLING | 0.40 | 740($Ae_1$ + 5) | 1.0 | 0.10 | 700 |
| 13 | 735 | 830($Ae_1$ + 95) | AIR COOLING | 0.40 | 760($Ae_1$ + 25) | 1.0 | 0.10 | 700 |
| 14 | 735 | 830($Ae_1$ + 95) | AIR COOLING | 0.40 | 800($Ae_1$ + 65) | 1.0 | 0.10 | 700 |
| 15 | 735 | 830($Ae_1$ + 95) | AIR COOLING | 0.40 | 820($Ae_1$ + 85) | 1.0 | 0.10 | 700 |
| 16 | 735 | 830($Ae_1$ + 95) | AIR COOLING | 0.40 | 840($Ae_1$ + 105) | 1.0 | 0.10 | 700 |
| 17 | 735 | 830($Ae_1$ + 95) | AIR COOLING | 0.40 | 870($Ae_1$ + 135) | 1.0 | 0.10 | 700 |

TABLE 2

| | EVALUATION | | |
|---|---|---|---|
| EXPERIMENT No. | HARDNESS (Hv240 or less) | STRUCTURE SPHEROIDIZING | OVERALL |
| 1 | GOOD | GOOD | GOOD |
| 2 | GOOD | GOOD | GOOD |
| 3 | GOOD | GOOD | GOOD |
| 4 | GOOD | POOR | POOR |
| 5 | POOR | POOR | POOR |
| 6 | GOOD | GOOD | GOOD |
| 7 | POOR | POOR | POOR |
| 8 | POOR | POOR | POOR |
| 9 | POOR | GOOD | POOR |
| 10 | GOOD | GOOD | GOOD |
| 11 | GOOD | GOOD | GOOD |
| 12 | POOR | GOOD | POOR |
| 13 | GOOD | GOOD | GOOD |
| 14 | GOOD | GOOD | GOOD |
| 15 | GOOD | GOOD | GOOD |
| 16 | GOOD | POOR | POOR |
| 17 | POOR | POOR | POOR |

TABLE 3

| EXPERIMENT No. | Ae₁ (° C.) | WARM FORGING PROCESS | | ANNEALING PROCESS | | | | |
|---|---|---|---|---|---|---|---|---|
| | | FORGING TEMPERATURE (° C.) | COOLING TEMPERATURE (° C.) | TEMPERATURE RISING RATE (° C./s) | SOAKING TEMPERATURE (° C.) | SOAKING TIME (h) | COOLING RATE (° C./s) | COOLING TEMPERATURE (° C.) |
| 18 | 735 | 830(Ae₁ + 95) | AIR COOLING | 0.08 | 780(Ae₁ + 45) | 1.0 | 0.10 | 600 |
| 19 | 735 | 830(Ae₁ + 95) | AIR COOLING | 0.40 | 780(Ae₁ + 45) | 1.0 | 0.10 | 600 |
| 20 | 735 | 830(Ae₁ + 95) | AIR COOLING | 0.40 | 740(Ae₁ + 5) | 1.0 | 0.10 | 700 |
| 21 | 735 | 830(Ae₁ + 95) | AIR COOLING | 0.40 | 750(Ae₁ + 15) | 1.0 | 0.10 | 700 |
| 22 | 735 | 830(Ae₁ + 95) | AIR COOLING | 0.40 | 760(Ae₁ + 25) | 1.0 | 0.10 | 700 |
| 23 | 735 | 830(Ae₁ + 95) | AIR COOLING | 0.40 | 780(Ae₁ + 45) | 1.0 | 0.10 | 700 |
| 24 | 735 | 830(Ae₁ + 95) | AIR COOLING | 0.40 | 800(Ae₁ + 65) | 1.0 | 0.10 | 700 |
| 25 | 735 | 830(Ae₁ + 95) | AIR COOLING | 0.40 | 820(Ae₁ + 85) | 1.0 | 0.10 | 700 |
| 26 | 735 | 830(Ae₁ + 95) | AIR COOLING | 0.40 | 840(Ae₁ + 105) | 1.0 | 0.10 | 700 |
| 27 | 735 | 830(Ae₁ + 95) | AIR COOLING | 0.40 | 850(Ae₁ + 115) | 1.0 | 0.10 | 700 |
| 28 | 735 | 830(Ae₁ + 95) | AIR COOLING | 0.40 | 870(Ae₁ + 135) | 1.0 | 0.10 | 700 |
| 29 | 735 | 830(Ae₁ + 95) | AIR COOLING | 0.40 | 780(Ae₁ + 45) | 0.0 | 0.10 | 700 |
| 30 | 735 | 830(Ae₁ + 95) | AIR COOLING | 0.40 | 780(Ae₁ + 45) | 0.5 | 0.10 | 700 |
| 31 | 735 | 830(Ae₁ + 95) | AIR COOLING | 0.40 | 780(Ae₁ + 45) | 1.0 | 0.10 | 700 |
| 32 | 735 | 830(Ae₁ + 95) | AIR COOLING | 0.40 | 780(Ae₁ + 45) | 1.5 | 0.10 | 700 |
| 33 | 735 | 830(Ae₁ + 95) | AIR COOLING | 0.40 | 780(Ae₁ + 45) | 2.0 | 0.10 | 700 |
| 34 | 735 | 830(Ae₁ + 95) | AIR COOLING | 0.40 | 780(Ae₁ + 45) | 1.0 | 0.12 | 600 |
| 35 | 735 | 830(Ae₁ + 95) | AIR COOLING | 0.40 | 780(Ae₁ + 45) | 1.0 | 0.27 | 600 |
| 36 | 735 | 830(Ae₁ + 95) | AIR COOLING | 0.40 | 780(Ae₁ + 45) | 1.0 | 0.43 | 600 |
| 37 | 735 | 830(Ae₁ + 95) | AIR COOLING | 0.40 | 780(Ae₁ + 45) | 1.0 | 1.55 | 600 |
| 38 | 735 | 830(Ae₁ + 95) | AIR COOLING | 0.40 | 780(Ae₁ + 45) | 1.0 | 0.10 | 600 |
| 39 | 735 | 830(Ae₁ + 95) | AIR COOLING | 0.40 | 780(Ae₁ + 45) | 1.0 | 0.10 | 650 |
| 40 | 735 | 830(Ae₁ + 95) | AIR COOLING | 0.40 | 780(Ae₁ + 45) | 1.0 | 0.10 | 700 |
| 41 | 735 | 830(Ae₁ + 95) | AIR COOLING | 0.40 | 780(Ae₁ + 45) | 1.0 | 0.10 | 730 |
| 42 | 735 | 830(Ae₁ + 95) | AIR COOLING | 0.40 | 780(Ae₁ + 45) | 1.0 | 0.10 | 750 |
| 43 | 735 | 830(Ae₁ + 95) | AIR COOLING | 0.40 | 780(Ae₁ + 45) | 1.0 | 0.10 | 780 |

TABLE 4

| EXAMPLE | Ae₁ (° C.) | WARM FORGING PROCESS | | ANNEALING PROCESS | | | | |
|---|---|---|---|---|---|---|---|---|
| | | FORGING TEMPERATURE (° C.) | COOLING TEMPERATURE (° C.) | TEMPERATURE RISING RATE (° C./s) | SOAKING TEMPERATURE (° C.) | SOAKING TIME (h) | COOLING RATE (° C./s) | COOLING TEMPERATURE (° C.) |
| 1 | 735 | 770 (Ae₁ + 35) | AIR COOLING | 0.40 | 770 (Ae₁ + 35) | 0.5 | 0.27 | 700 |
| 2 | 735 | 830 (Ae₁ + 95) | AIR COOLING | 0.40 | 810 (Ae₁ + 75) | 2.5 | 0.27 | 700 |

TABLE 5

| | EVALUATION | | | | |
|---|---|---|---|---|---|
| | RESIDUAL AUSTENITE (Vol %) | | AMOUNT OF RESIDUAL AUSTENITE (15 vol % or less) | HARDNESS (Hv240 or less) | STRUCTURE SPHEROIDIZING |
| EXAMPLE 1 | SURFACE LAYER | 13.1 | SURFACE LAYER GOOD | GOOD | GOOD |
| | CENTER | 10.3 | CENTER GOOD | | |
| EXAMPLE 2 | SURFACE LAYER | 12.1 | SURFACE LAYER GOOD | GOOD | GOOD |
| | CENTER | 9.1 | CENTER GOOD | | |

What is claimed is:

1. A method of producing a roughly shaped material for a rolling bearing by forging a steel composed of a high-carbon chrome bearing steel of which a Vickers hardness is Hv240 or less containing 0.7 mass % to 1.2 mass % of a carbon, and 0.8 mass % to 1.8 mass % of a chromium, the method comprising:

(A) forging the steel to a predetermined shape while heating the steel to a forging temperature in a range of (Ae₁ point+25° C.) to (Ae₁ point+105° C.), and cooling a forged article to a temperature of Ae₁ point or lower; and (B) performing an annealing in which the forged article obtained in (A) is heated to a soaking temperature in a range of (Ae₁ point+25° C.) to (Ae₁ point+85° C.), the forged article is retained for 0.5 hours or longer and 1 hour or shorter, and the forged article is cooled down to 700° C. or lower at a cooling rate of 0.020° C./s or faster and 0.30° C./s or slower.

2. The method of producing a roughly shaped material for a rolling bearing according to claim 1,
wherein the soaking temperature is set to 760° C. to 820° C.

3. The method of producing a roughly shaped material for a rolling bearing according to claim 1,
wherein the cooling rate is set to 0.27° C./s or slower.

4. The method of producing a roughly shaped material for a rolling bearing according to claim 2,
wherein the cooling rate is set to 0.27° C./s or slower.

* * * * *